(12) United States Patent
Ekren

(10) Patent No.: US 11,076,587 B2
(45) Date of Patent: Aug. 3, 2021

(54) SYSTEMS, METHODS, AND APPARATUSES FOR IMPLEMENTING A CENTER-PIN HOUSING-FREE REEL WITH VARIABLE RESISTANCE BRAKING AND A CASTING PIVOT UPON A TRANSAXIAL PLANE

(71) Applicant: Estate of Bart Ekren, Newberg, OR (US)

(72) Inventor: Bart Ekren, Newberg, OR (US)

(73) Assignees: Estate of Bart Ekren, Newburg, OR (US); Anita Ekren, Loveland, CO (US)

( * ) Notice: Subject to any disclaimer, the term of this patent is extended or adjusted under 35 U.S.C. 154(b) by 190 days.

(21) Appl. No.: 16/351,185

(22) Filed: Mar. 12, 2019

(65) Prior Publication Data

US 2020/0288688 A1 Sep. 17, 2020

(51) Int. Cl.
*A01K 89/01* (2006.01)
*A01K 89/0155* (2006.01)
*A01K 89/015* (2006.01)

(52) U.S. Cl.
CPC .. *A01K 89/01556* (2015.05); *A01K 89/01921* (2015.05)

(58) Field of Classification Search
CPC .............. A01K 89/016; A01K 89/0162; A01K 89/01925; A01K 89/046; A01K 89/051;
(Continued)

(56) References Cited

U.S. PATENT DOCUMENTS 1,617,543 A * 2/1927 Roberts .................. A01K 89/06
242/229

2,515,896 A * 7/1950 Rakoczy .............. A01K 89/027
242/241
(Continued)

*Primary Examiner* — Emmanuel M Marcelo
(74) *Attorney, Agent, or Firm* — Elliott, Ostrander & Preston, P.C.

(57) ABSTRACT

Systems, methods, and apparatuses for implementing a center-pin housing-free reel with variable resistance braking and a casting pivot upon a transaxial plane are described herein. For example, according to one embodiment there is a fishing rod and reel system, including: a fishing rod; a fishing reel assembly; and in which the fishing reel assembly includes: a rotatable mount having a mount segment which is to affix the fishing reel assembly with a mount receiver of a fishing rod and a rotating segment, in which the rotating segment pivots upon an axis separate from the mount segment; a structural brace affixed to the rotating segment of the rotatable mount; a centerpin mount affixed to the structural brace at a first end of the centerpin; a reel mounted upon the centerpin and affixed to the centerpin via a fastener secured to a second end of the centerpin, in which the reel is to rotate upon the centerpin between the structural brace and the fastener; a variable resistance braking assembly affixed to the rotating segment of the rotatable mount, in which the variable resistance braking assembly is to pivot with the reel, in which the variable resistance braking assembly includes at least (i) a lever, (ii) a spring, and (iii) a resistance contact point oriented at a portion of the lever which makes physical contact with the reel; and in which the spring has a preload to pull the resistance contact point of the lever into the reel and further in which braking force of the variable resistance braking assembly is increased when the lever is pressed into the reel and decreased or negated when the variable resistance braking assembly is retracted from the reel. Other related embodiments are disclosed.

20 Claims, 9 Drawing Sheets

(58) Field of Classification Search
CPC .... A01K 89/056; A01K 89/06; A01K 89/081; A01K 89/059
See application file for complete search history.

(56) References Cited

U.S. PATENT DOCUMENTS

| | | | | |
|---|---|---|---|---|
| 2,612,325 A * | 9/1952 | Johnson | ............ | A01K 89/06 242/229 |
| 2,749,057 A * | 6/1956 | Jenkins | ............ | A01K 89/06 242/229 |
| 2,910,252 A * | 10/1959 | Joy | ............ | A01K 89/017 242/226 |
| 2,918,227 A * | 12/1959 | Mauborgne | ............ | A01K 89/0114 242/249 |
| 2,941,748 A * | 6/1960 | Matthiesen | ............ | A01K 89/06 242/229 |
| 3,384,320 A * | 5/1968 | Cortez | ............ | A01K 89/06 242/229 |
| 3,498,561 A * | 3/1970 | Smith | ............ | A01K 89/06 242/229 |
| 3,727,857 A * | 4/1973 | Chann | ............ | A01K 89/06 242/229 |
| 3,944,159 A * | 3/1976 | Dobbs | ............ | A01K 89/06 242/229 |
| 4,106,717 A * | 8/1978 | Thiel | ............ | A01K 89/06 242/229 |
| 4,640,471 A * | 2/1987 | Murakami | ............ | A01K 89/01925 242/258 |
| 4,688,738 A * | 8/1987 | Britten | ............ | A01K 89/06 242/228 |
| 6,561,448 B2 * | 5/2003 | Barker | ............ | A01K 89/06 242/229 |
| 7,896,277 B2 * | 3/2011 | Lombardo | ............ | A01K 89/06 242/229 |
| 8,783,596 B2 * | 7/2014 | Kendra | ............ | A01K 89/06 242/229 |
| 8,876,031 B2 * | 11/2014 | Bloemendaal | ............ | A01K 89/06 242/229 |
| 9,220,248 B2 * | 12/2015 | McCord | ............ | A01K 89/06 |

* cited by examiner

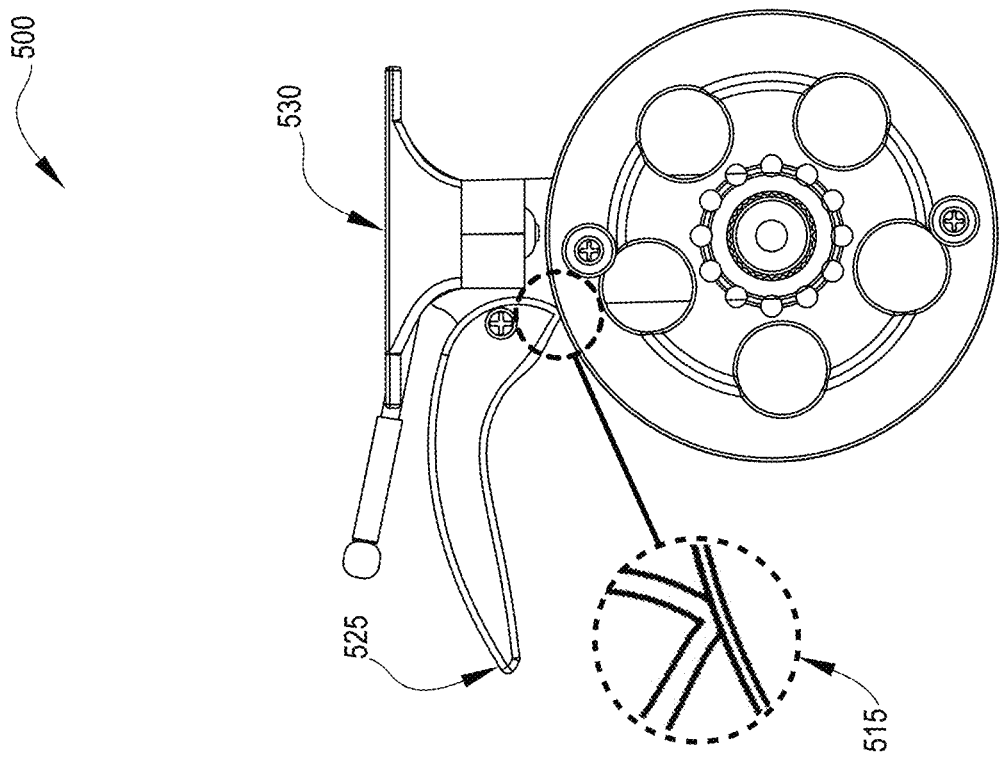
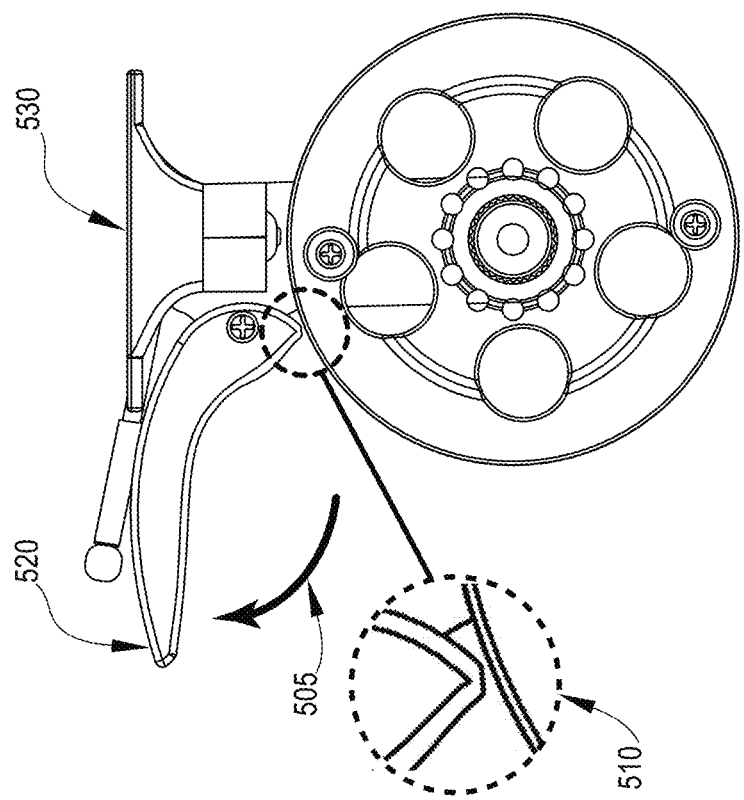

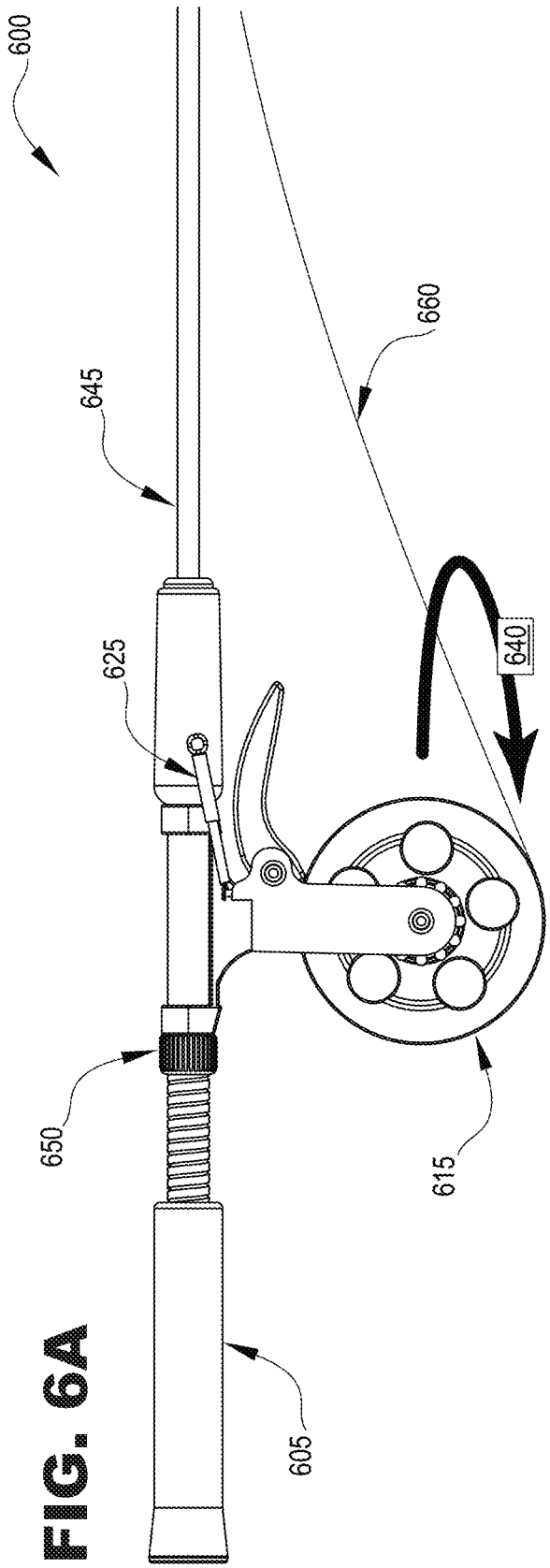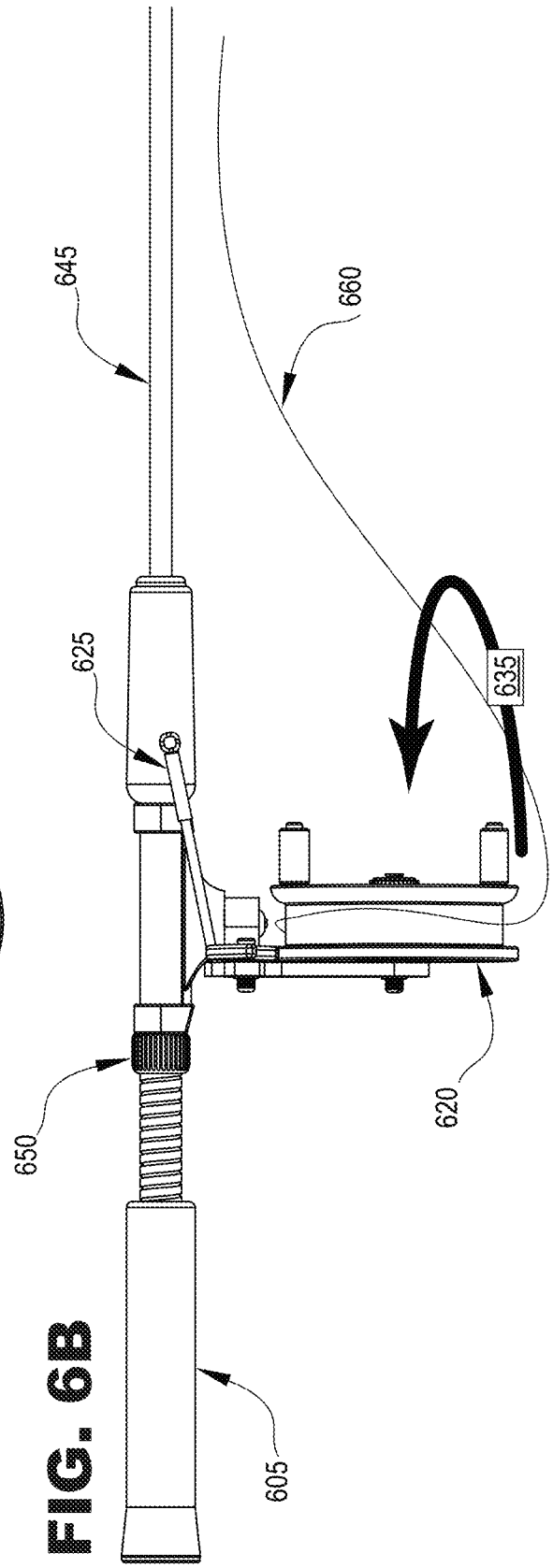

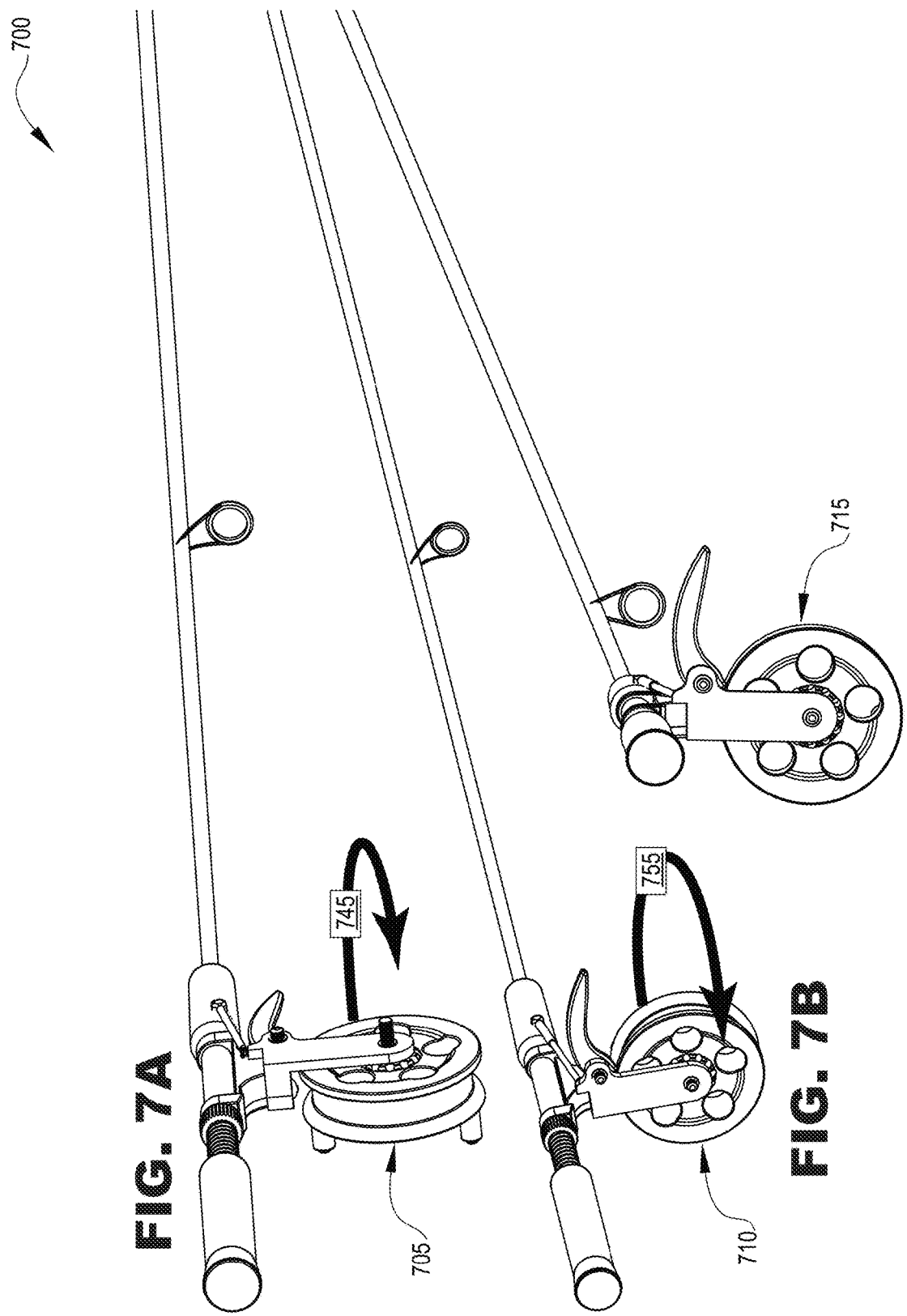

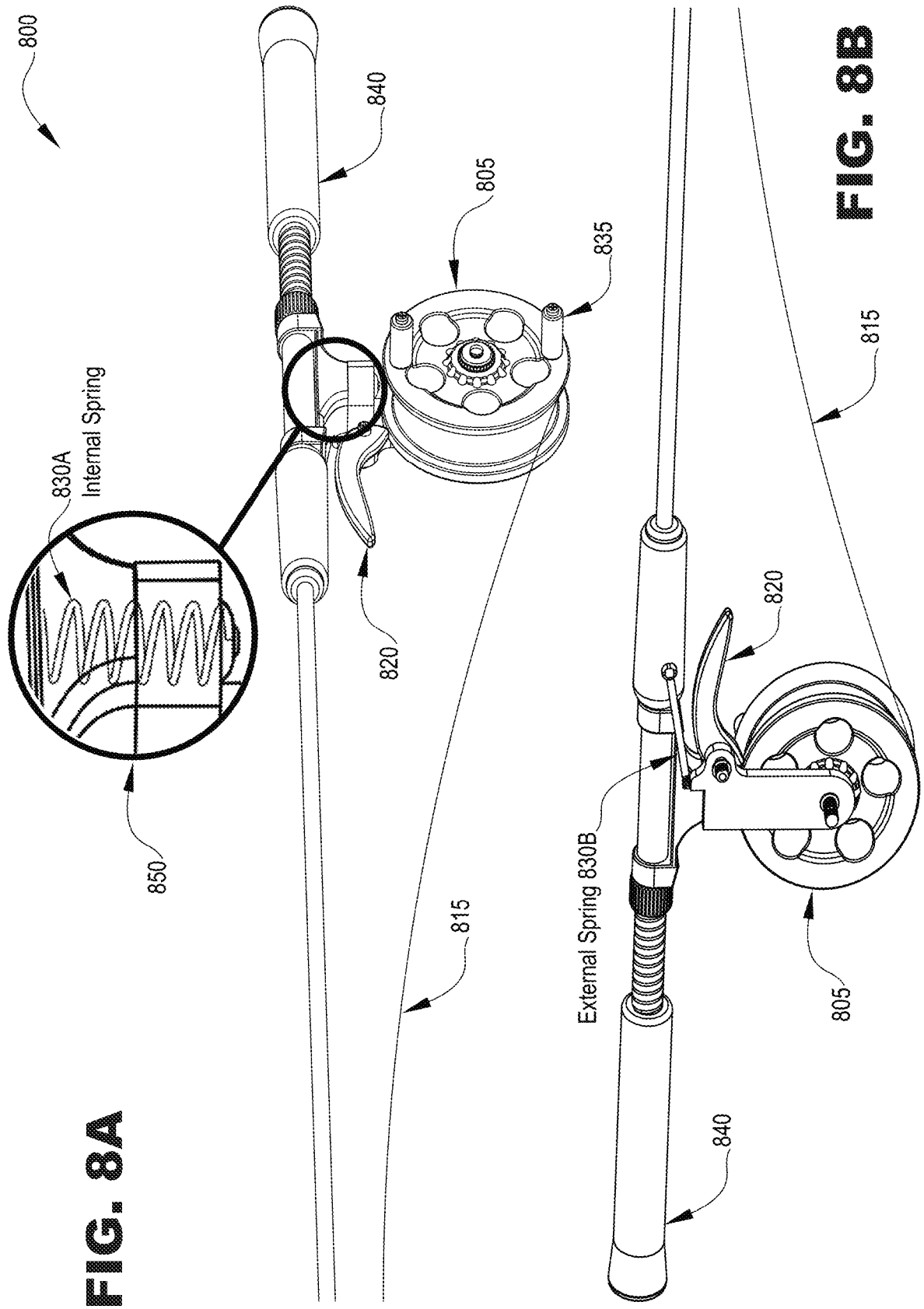

SYSTEMS, METHODS, AND APPARATUSES FOR IMPLEMENTING A CENTER-PIN HOUSING-FREE REEL WITH VARIABLE RESISTANCE BRAKING AND A CASTING PIVOT UPON A TRANSAXIAL PLANE

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of fishing reels. More particularly, disclosed embodiments relate to systems, methods, and apparatuses for implementing and utilizing a center-pin housing-free reel with variable resistance braking and a casting pivot upon a transaxial plane.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

Conventional fly fishing rods utilize a string that is pulled manually by the operator without any reel mechanism whatsoever. Fly fishing is an angling method in which an artificial "fly" is used to catch fish. While a conventional reel may optionally be utilized, typically casting methods for fly fishing utilize a very lightweight fly or "lure" upon a hand pulled line (e.g., without a reel) which requires casting techniques significantly different from other forms of reel based casting.

Unlike other casting methods, fly fishing may be thought of as a method of casting line rather than casting the lure as is done with reel based methods. Non-flyfishing methods rely on a lure's weight to pull line from the reel during the forward motion of a cast. Conversely, a traditional fly for fly fishing is too light to be cast, and thus simply follows the unfurling of a properly cast fly line, which is heavier and tapered and therefore more castable than lines used in other types of fishing.

The most common type of cast for fly fishermen is likely the forward cast, where the angler whisks the fly into the air, back over the shoulder until the line is nearly straight, then forward, using primarily the forearm. The objective of this motion is to induce load into the rod tip with stored energy within the rod and then transmit that energy into the line, resulting in the fly line (and the attached fly) being cast forward by some distance. However, simply bending the rod and releasing it to jerk the fly line forward will not propel the fly line a sufficient distance. Rather, a complex movement of the rod through an arc acting as a lever is necessary to magnify the angler's hand movement through an arc at the handle to a larger arc of many feet at the rod tip, thus utilizing the rod as a lever in which a force is applied between the fulcrum and the load. The fulcrum in the fly cast is below the caster's hand gripping the rod, whereas the load is induced at the rod tip. A fly caster's stroke backward and forwards operates the rod as a lever having some limited flexibility. Other typical casts include a roll cast, a single-haul cast, a double-haul cast, a tuck cast, a side-cast, and a curve-cast.

While fly-fishing purists will certainly argue that use of a "reel" is the antipathy of true "fly fishing," none are likely to argue that fly-fishing techniques are simple or easy to learn. Indeed, the complexities and challenges of successful fly-fishing are what attracts many anglers to the sport.

Problematically, fly fishing without a reel can be a frustrating endeavor for a novice angler in which the line will invariably become tangled, knotted, strewn across the ground, etc.

At the opposite extreme, a conventional reel may generally be described as a cylindrical device attached to a fishing rod used in winding and stowing fishing line, in which modern reels usually have fittings aiding in casting for distance and accuracy, as well as a mechanism for retrieving line, and largely avoiding the problem of fishing line management associated with fly fishing. Most notably, a conventional fly fishing reel, in addition to storing line within its housing, provides for a smooth uninterrupted tensionless release of line during a cast and a consistent drag tension to counter a fish run pulling on the line, both of which make a conventional fly reel unsuitable for use with fly fishing casting techniques.

A hybrid reel is thus described herein which may be utilized with fly fishing techniques and fly fishing casts, yet aids a less experienced angler by providing some benefits of fishing line management. Such a reel, however, is notably distinct from a conventional fishing reel due to its lack of a housing and variable resistance braking, as will be described in greater detail below.

The present state of the art may therefore benefit from the systems, methods, and apparatuses for implementing and utilizing a center-pin housing-free reel with variable resistance braking and a casting pivot upon a transaxial plane as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIGS. 5A and 5B depict another view of a fly fishing reel, in accordance with described embodiments;

FIGS. 6A and 6B depict another view of a fly fishing reel and rod system, in accordance with described embodiments;

FIGS. 7A, 7B, and 7C depict another view of a fly fishing reel and rod system, in accordance with described embodiments;

FIGS. 8A and 8B depict alternative views of the fly fishing reel and rod system, in accordance with described embodiments.

DETAILED DESCRIPTION

Figure 1:
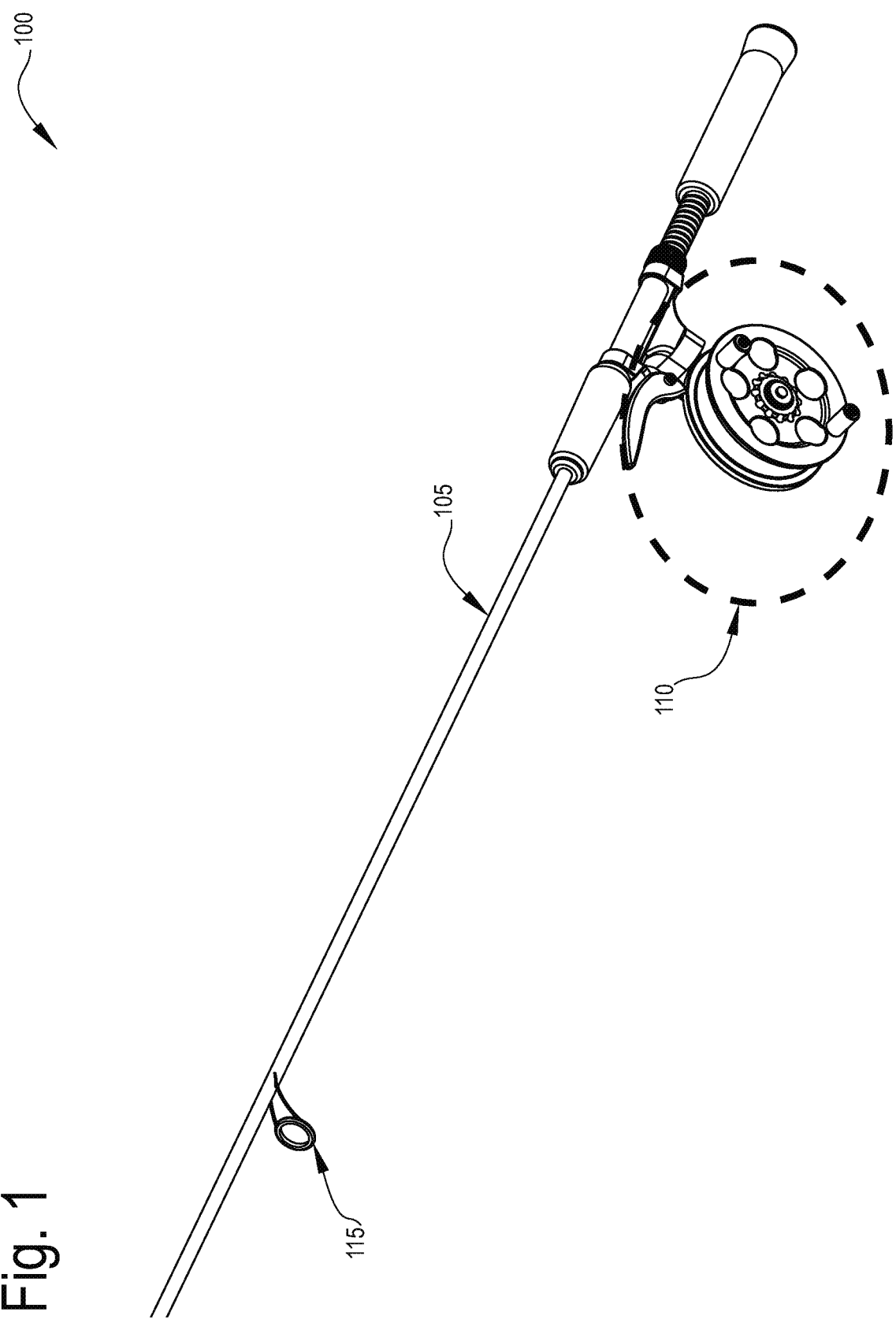
FIG. 1 depicts an exemplary architecture fly fishing system including at least a rod and reel, in accordance with described embodiments.

Described herein are systems, methods, and apparatuses for implementing and utilizing a center-pin housing-free reel with variable resistance braking and a casting pivot upon a transaxial plane.

For instance, according to a particular embodiment, there are means for implementing and utilizing a center-pin housing-free reel with variable resistance braking and a casting pivot upon a transaxial plane. For example, according to one embodiment there is a fishing rod and reel system, including: a fishing rod; a fishing reel assembly; and in which the fishing reel assembly includes: a rotatable mount having a mount segment which is to affix the fishing reel assembly with a mount receiver of a fishing rod and a rotating segment, in which the rotating segment pivots upon an axis separate from the mount segment; a structural brace affixed to the rotating segment of the rotatable mount; a centerpin mount affixed to the structural brace at a first end of the centerpin; a reel mounted upon the centerpin and affixed to the centerpin via a fastener secured to a second end of the centerpin, in which the reel is to rotate upon the centerpin between the structural brace and the fastener; a variable resistance braking assembly affixed to the rotating segment of the rotatable mount, in which the variable resistance braking assembly is to pivot with the reel, in which the variable resistance braking assembly includes at least (i) a lever, (ii) a spring, and (iii) a resistance contact point oriented at a portion of the lever which makes physical contact with the reel; and in which the spring has a preload to pull the resistance contact point of the lever into the reel and further in which braking force of the variable resistance braking assembly is increased when the lever is pressed into the reel and decreased or negated when the variable resistance braking assembly is retracted from the reel.

The described fishing reel provides for a simple elegance permitting anglers to utilize a hand position in front of the reel for a more balanced position compared to others reels presently available in the marketplace today. The described reel pivots for easy and very long casting utilizing fly fishing techniques permitting the line to fall over and off of the leading rim of the reel without necessitating the line to de-spool or to even rotate the reel in any way whatsoever when casting, despite the presence of a reel on the fly fishing rod.

Moreover, certain embodiments include an external spring which provides a counter load upon the reel providing a mechanical advantage for returning the reel to its non-pivoted position and further permitting simple maintained as the external spring may be easily replaced. The simple and natural brake motion and mechanism stops free spooling with ease to create a "wet fly swing" type cast while maintaining an effective and easy to maintain solution via the externally mounted spring resistance for the brake. Because both rims are exposed, alternative braking via fingertip drag control is provided.

When the reel is pivoted, a less acute angle of line is realized making the fishing line far less likely to cut or burn an angler's fingers while guiding the line and while reeling.

According to such embodiments, the reel is free spooling for effective drifts and oriented in a natural position permitting single finger control of the variable resistance brake or fingering of the reel directly to slow or arrest its rotation. Still further, braking of the reel very effectively prevents unwinding of the line when fish is not presently hooked upon the line.

The simple design and clean mechanism permits tool-less reel removal and re-attachment so as to facilitate an easy fix for line mishaps by the angler whilst permitting two-handed casting for comfort and less arm strain or single hand casting where desired, resulting in an extremely versatile reel and rod system for the use of float fishing, lures (e.g., "shooting head") fly line fishing. Further still, for fly line casting, there is no need for false casting as the reel permits the line to be reeled into where the shooting head is attached to the line and then fired out again with a comfortable two-handed cast.

Because the reel is easily removed, line may be spooled onto the reel separate from the rod and reel attachments as an effective handline reel, thus permitting the angler to cast the line, allow the bait to run, and then hand reel the line back in. In such a way, a simple and inexpensive handle for a handline reel may be kept with a "bug out bag" for survivalists seeking compact, lightweight, and minimalist solutions.

In the following description, numerous specific details are set forth such as examples of specific configurations, use cases, materials, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by specially manufactured components or may utilize general-purpose components in certain instances to realize and perform the innovative function and configuration of the described embodiments. Alternatively, the operations may be performed by a combination of customized specially manufactured components with certain general purpose components to make, use, and practice the inventive aspects as set forth herein.

FIG. 1 depicts an exemplary architecture fly fishing system 100 including at least a rod 105 and reel 110, in accordance with described embodiments.

Specifically, there is depicted here the fly fishing rod 105 with eyelets 105 (additional eyelets 115 are utilized but not shown) upon which there is affixed a housingless reel 110.

Because conventional fly fishing rods have no reel whatsoever, it is necessary for the angler to manage the line throughout the cast, typically by collecting line into a worn basket and releasing line from the basket. Where anglers depart from a pure fly fishing technique and utilize a conventional centerpin reel, such anglers will be faced with the reality that such reels are lacking in any kind of a tension management function. Such centerpin reels (also called "float reels") simply utilize a ball bearing which thus permits them to spin freely. While this is preferred for certain applications, a centerpin reel with variable tension would be strongly preferred for use with a hybrid fly fishing cast as noted above.

Notably, conventional centerpin reels are intentionally designed to minimize and eliminate drag tension to the extent feasible, and thus serve a distinct application that that which is proposed for the hybrid reel described herein which permits variable resistance braking.

Figure 2:
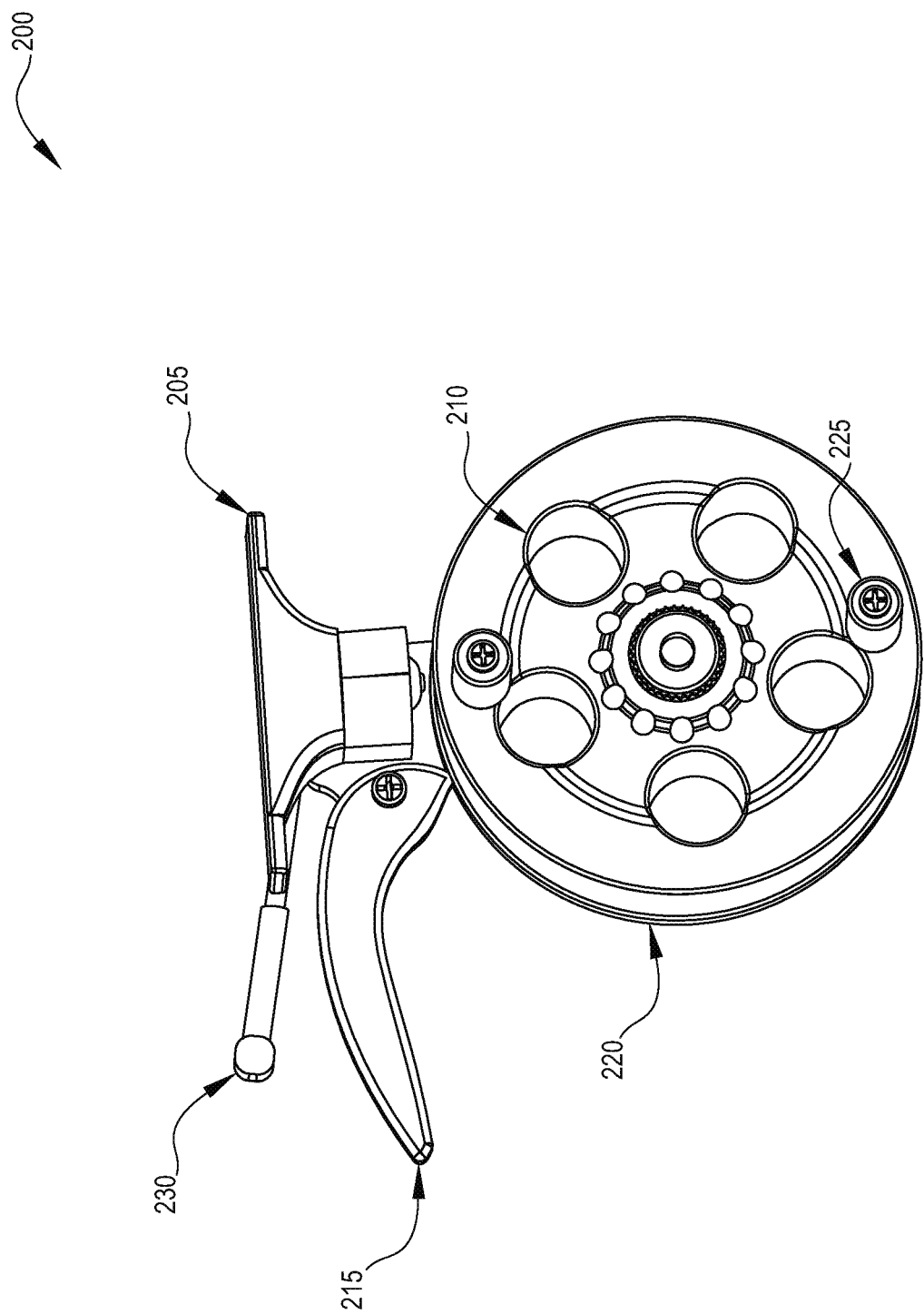
FIG. 2 depicts another view of a fly fishing reel, in accordance with described embodiments.

FIG. 2 depicts another view of a fly fishing reel 200, in accordance with described embodiments.

As shown here, there is a centerpin reel 220 which wholly lacks a housing. Additionally depicted are holes within the reel via which an angler may rotate the reel with a finger to wind and retrieve fishing line as well as winding posts 225 which may be grasped by the angler to accomplish the same. Still further depicted is a rotatable mount 205 via which to affix the reel to a fishing rod, whilst permitting the reel to rotate about an axis (e.g., as opposed to being fixably held in plane with the rod to which the reel is affixed). The rotatable mount 205 may be observed at FIG. 1 in its affixed configuration, via which the reel 220 is mounted upon the rod 105 as shown at FIG. 1. Once affixed to the rod 105, the reel 220 may pivot or rotate upon its axis via the rotatable mount.

Lastly, there is depicted a tensioner 230 such as a spring or other tension device to return a rotated reel to an original (non-rotated) position and a variable resistance brake via which an angler may apply variable braking resistance to the reel, for example, to permit the reel to spin freely (when resistance braking is wholly removed) or to resist movement of the reel when resistance braking force is applied to the reel through the brake, or some variation thereof.

Such a reel provides certain benefits to the angler. For instance, the finger holes 210 are smooth and large, with a gentle angle, thus permitting the angler to wind or rotate the reel without the need for a finger protector, as is commonly required with conventional reels.

Another distinct advantage is the use of the reel to wind and manage fishing line which negates the need to grab the fishing line by hand. There is a serious risk of a friction burn or a rope burn when the fishing line is pulled by hand if it is under tension as the line will slide through the angler's hand, thus resulting in a painful and potentially serious burn. As shown here, the variable resistance braking lever 215 may be used to apply a braking force to the reel 220, thus interrupting or preventing any rotation of the reel via a line which is under tension, without having to manually secure the fishing line by hand, thus risking a burn.

Yet another advantage of the described housingless centerpin reel system is the ability cast with only a single hand, whereas conventional fly fishing apparatuses require both hands. Thus, a user or angler which suffers from, for example, a weak or injured shoulder, may nevertheless operate the fly rod and reel whereas doing so may risk further injury or fatigue with conventional systems, or simply be impossible if, for example, one arm is immobilized. Use of the depicted reel 220 permits casting and variably tensioning the line as well as controlling line release tension with a single hand. While use of the reel 220 is feasible via a single hand, use of two hands will provide greater leverage.

Unlike conventional fly rods without a reel, use of the reel 220 depicted here permits the line to free spool, releasing more line once a fly and float are cast into the water, whereas a fly rod without a reel requires the angler to hand feed the line so as to prevent knotting and tangles. In such a way, a reserve or pool of additional fishing line may be easily maintained via the reel 220, while nevertheless permitting the use of traditional fly casts via the fly rod.

According to certain embodiments, the variable resistance brake 215 applies a braking force to the reel 220 by default, and the angler eases tension by pulling back on the lever portion of the variable resistance brake 215. Similarly, additional braking force may be applied to the reel 220 by pressing the lever of the variable resistance brake 215 with greater force. According to another embodiment, the tension or resistive braking force applied to the reel 220 by the variable resistance brake 215 is tunable, thus permitting the angler to adjust the default resistance upwards from zero up to a maximum braking pressure permitted by the structure of the variable resistance brake 215, the reel, and the rotatable mount 205. For instance, a spring pulling a contact pad of the variable resistance brake 215 into the reel 220 may be adjustable via a tensioner knob. Thus, the tunable tension will be applied to the reel 220 by the variable resistance brake 215 as a configurable default, but may be increased or decreased by the angler at will by pressing the lever into the reel 220 or by pulling the lever toward the rod and away from the reel, so as to increase or decrease the variable resistance braking force.

In other embodiments, a coiled or wound spring may be embedded within the rotatable mount at the pivot point between the mount and the lever of the variable resistance brake 215 as an internal spring, thus eliminating the need for an external spring while nevertheless providing the rotational force upon the lever of the variable resistance brake 215 which thus applies a braking force into the reel 220. While the internal spring reduces the chance of a snag, the external spring is easier to replace.

According to another embodiment, finger pressure may be applied to the reel due to the housingless configuration of the reel 220, in which the angler induces friction resistance upon the reel 220 via the angler's fingers or palm, thus creating tension on the fishing line, which is especially helpful when a fish is hooked. While conventional housing based reels provide such tension to the line, the housingless reel 220 operates in a distinct manner, permitting the angler to induce such tension manually through his hand which permits for a greater degree of control of the tension being formed on the line between the hooked fish and the rod. This functionality and operation scheme additionally permits for the angler to vary the tension responsively based on environmental conditions, whereas conventional housing based reels do not permit such real-time adjustment to the tension on the line. Consider for example a hooked fish which is pulling on the line. As the rod bows, increasing tension, the angler may simply release or reduce the friction applied to the reel from either the variable resistance brake 215 or from the angler's hand on the reel 220, thus yielding the desirable effect of a momentarily reduced tension on the reel and line.

Figure 3:
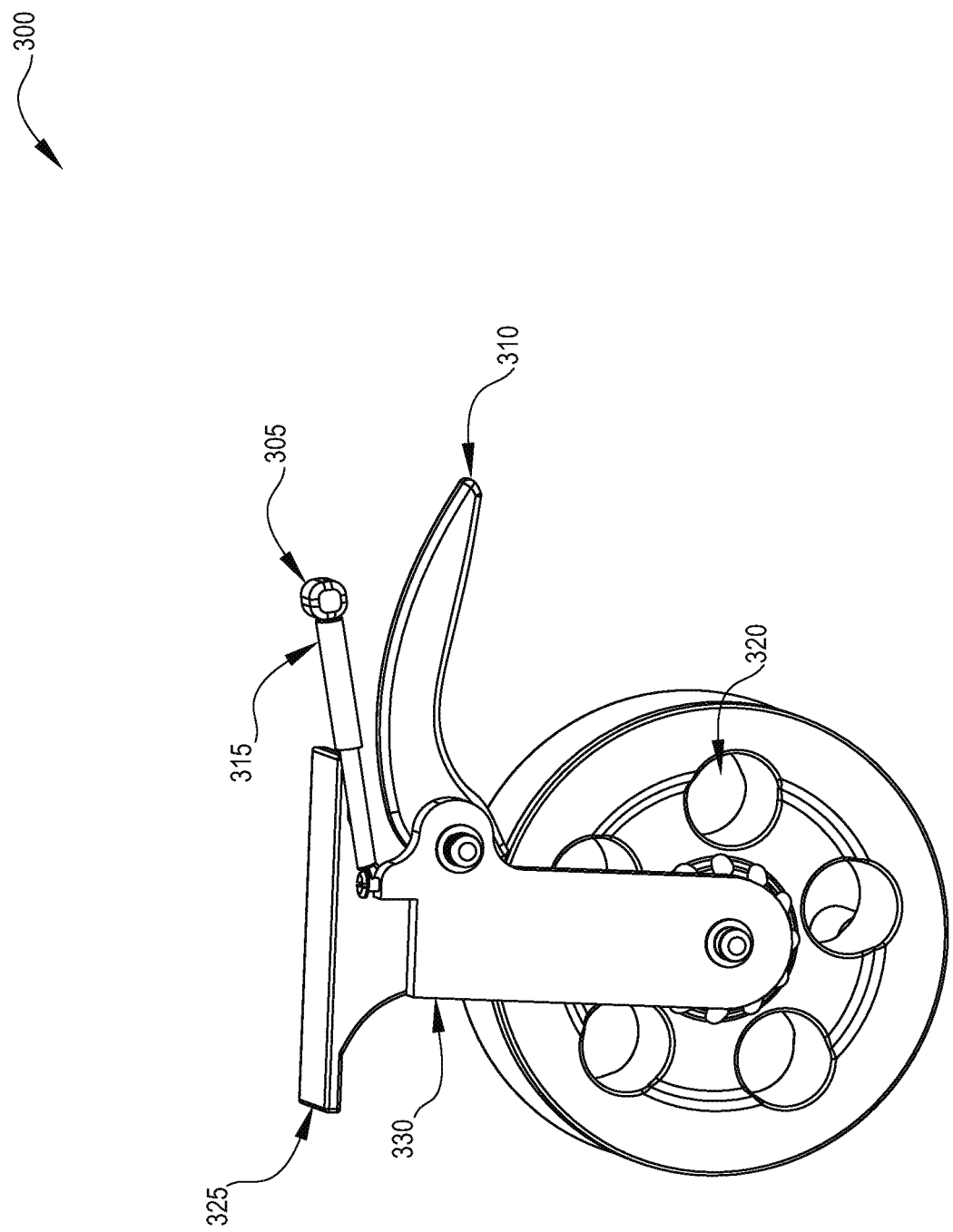
FIG. 3 depicts another view of a fly fishing reel, in accordance with described embodiments.

FIG. 3 depicts another view of a fly fishing reel 300, in accordance with described embodiments.

There is again depicted the rotatable mount 325 and the lever of the variable resistance brake 310. However, with this view of the reel from the opposite side (versus what is depicted at FIG. 2) it may now be observed in detail the connection point 305 of the spring 315 which applies a return force for the reel when the reel is rotated or pivoted upon its axis via the rotatable mount 325. Additionally depicted is a structural brace 330 upon which the centerpin reel is mounted and to which both the lever of the variable resistance brake 310 and also the spring 315 are attached.

According to a particular embodiment, the reel, when affixed to a rod via the rotatable mount 325, may be positioned in its original or default position in which the reel is oriented in plane with the rod, yet may be pivoted or rotated 90 degrees upon its axis so as to be positioned within a perpendicular plane, offset 90 degrees, from the plane of the rod. This concept is illustrated in greater detail and discussed further below with reference to FIGS. 6A, 6B, 7A, 7B, and 7C. Regardless, it is in accordance with such an embodiment that the structural brace 330 additionally forms a stop at 90 degrees of rotation to arrest the rotation of the reel around its pivot of the rotatable mount 325. For instance, as may be observed here, the structural brace 330, when rotated with the reel, comes into contact with the rotatable mount 325 at the point where the right angle recess at the upper left-hand portion of the structure brace is formed, thus holding the reel's position at a 90 degree offset from the plane of the rod.

According to one embodiment, the rod lies upon a transaxial plane and the reel resides also within the same transaxial plane of the rod. However, upon being rotated 90 degrees, the rod will remain within its transaxial plane and the reel will then lie upon or within a transverse plane, thus effectively being positioned at a cross section relative to the rod, as is depicted at each of FIGS. 6A, 6B, 7A, 7B, and 7C. The stop formed into the structural brace 330 permits correct positioning of the reel at its 90 degree rotational position. The spring 315 provides a return force so that when the reel is again rotated back to its original position upon a plane inline with the rod, the spring 315 will pull the reel back into position (e.g., pivoting the reel upon its axis via the rotatable mount) and then hold the reel in its original position. Additionally, the spring is positioned in such a way that the force pulls against the pivot point at a full 90 degree rotation so that the reel does not snap back from its rotated position without a manual nudge or bump, or some initial force to begin the return rotation so as to return the reel into the sample plane as the rod to which it is attached.

Figure 4:
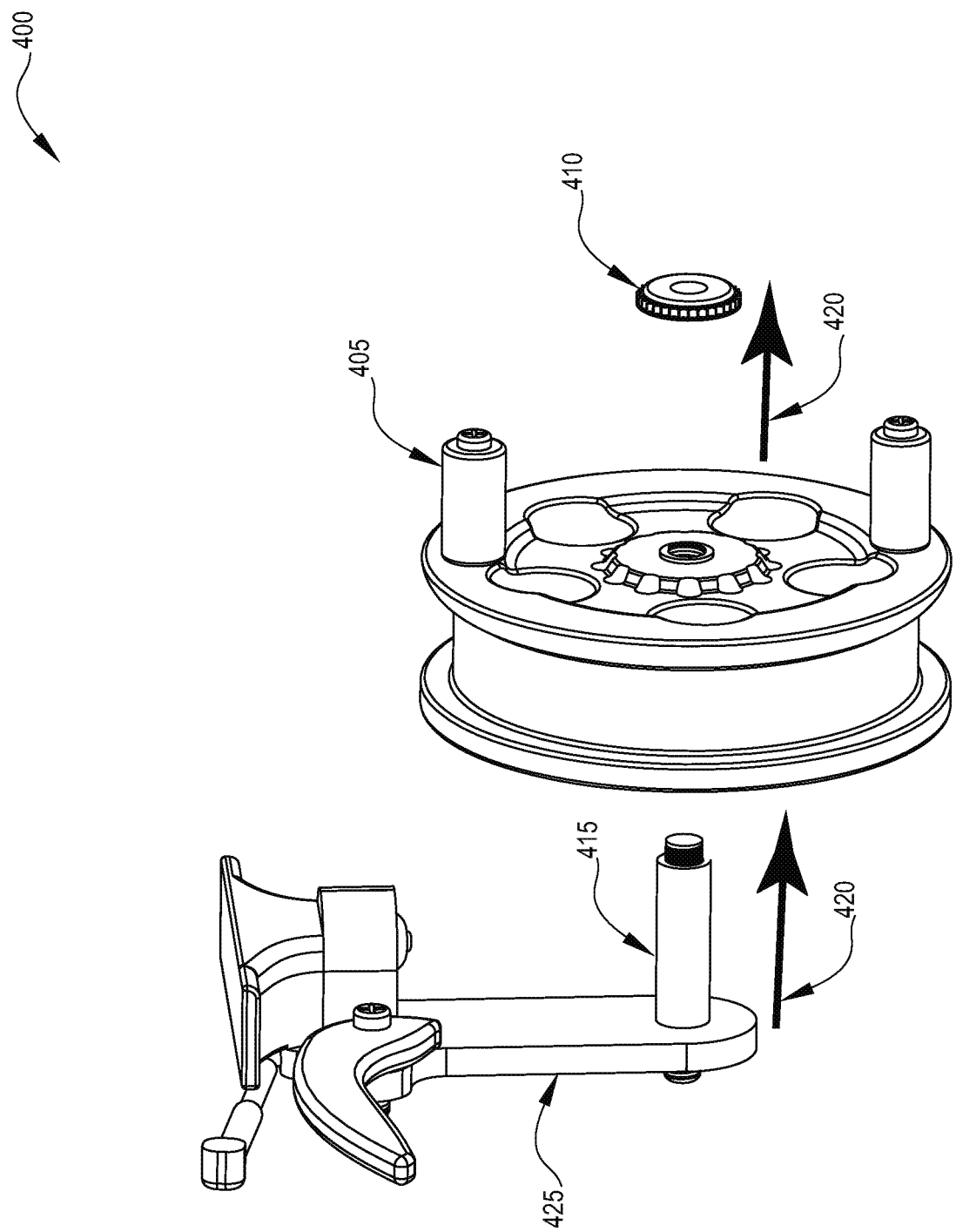
FIG. 4 depicts another view of a fly fishing reel, in accordance with described embodiments.

FIG. 4 depicts another view of a fly fishing reel 400, in accordance with described embodiments.

As shown here, the reel 405 is again depicted, however, it has been removed from its structural brace 425 upon which the centerpin reel mounts and rotates. Notably, there is a center pin 415 which may not be observed as having the reel 405 removed. The reel 405 is fastened to the center pin 415 via an opposing fastener 410, such as a threaded nut which may be tightened against the end post of the center pin 415 so as to fixably retain the reel 405 upon the structural brace 425 while simultaneously permitting the reel to spin or rotate freely upon the centerpin 415 when attached to the structural brace 425.

In accordance with described embodiments, a tool-less removal operation is enabled through the design of the opposing fastener 410 which permits hand tightening to fixably attach the reel 405 to the structural brace 425 and which further permits tool-less removal of the reel 405 from the structural brace 425 by hand loosening the opposing fastener 410 from the center pin 415 and thus from the structural brace 425 and the rotatable mount.

The directional arrows 420 depict the removal of the reel 405 from the structural brace 425 via the removal of the opposing fastener 410 which is important as thus functionality enables an angler to quickly remove the reel 405 from the rod entirely in the event of the fishing line becoming caught, bound, tangled, or snarled within the space between the reel and the structural brace 425. For instance, if a line has tension and jumps the grooved track within the reel 405, the line can very quickly become ensnarled within the structure of the assembled reel and rotatable mount, which can be extremely time consuming to untangle, or worse yet, may require the cutting of the line and replacement of the fly, each of which detract from the angler's presumed objective, which is to enjoy the sport of fishing, rather than toil with the frustrations of picking line out of the reel's assembly. Therefore, according to such embodiments, once the angler performs a tool-less removal of the reel from the structural brace 425 by hand loosening and removing the opposing fastener 410, thus freeing any tangled line wound around the center pin 415 mount, and then performs a tool-less re-assembly of the reel 405 to the structural brace 425, thus re-assembling the rod and reel system for continued use.

FIGS. 5A and 5B depict another view of a fly fishing reel 500, in accordance with described embodiments.

As depicted here, the reel again attached to the rotatable mount 530 permitting the reel and structural brace assembly to pivot 90 degrees when attached to a rod. Additionally depicted is the retract motion for the lever 520 on the left-hand side, which causes the variable resistance brake to assume a released position 510. As may be observed on the left, the contact point of the variable resistance brake is no longer in contact with the reel as shown by element 510, resulting in a frictionless rotation of the reel (e.g., frictionless with respect to the brake).

Conversely, as depicted on the right-hand side, there is depicted the default configuration of the variable resistance brake in which an angler releases his grip or retracting force upon the lever, thus causing the lever to assume its default position which is to apply its resistance braking to the reel in proportion to the spring force pulling the lever and contact point of the contacting lever 525 into the reel, thus resulting in the resistance at contact point 515 on the right hand side. Different materials may be utilized at the contact point 515 to alter the resistance and braking characteristics of the variable resistance brake so as to change the braking resistance given an identical force. For instance, hardened rubber or plastic composites may be utilized, wood may be utilized, ceramics or metals may be utilized, etc.

Moreover, because both sides of the reel are exposed (e.g., due to the housingless design) the brake may be utilized in conjunction with finger or hand braking as was described previously, in which the angler palms or fingers the surface of the reel so as to induce friction and slow or arrest its rotation.

FIGS. 6A and 6B depict another view of a fly fishing reel and rod system 600, in accordance with described embodiments.

As shown here, the fly fishing reel and rod system 600 which includes the rod itself 645, a handle portion 605 at a lower end of the rod 645, a releasable connector 650 for the rotatable mount (e.g., thus permitting quick release and re-attachment of the reel 615), an external spring 625 connected between the rod 645 and the structural brace which applies a return force to the structural brace to return a pivoted 620 reel back to its original position 620, and fishing line 660.

Further depicted are the directional arrows at elements 640 and 635. At the top portion, directional arrow 640 indicates how the reel may be rotated or pivoted from its original position which is in line with the rod 645 and thus occupies a same plane as the rod 645, into its pivoted or rotated position as may observed below, in which the reel is now resting upon the stop of the structural brace and thus occupying a 90 degree rotated position. At its 90 degree position, note that the structural brace comes into contact with the rotatable mount, thus permitting the reel to be rotated 90 degrees. Note further that increased spring load is induced into the now extended external spring 625, which will provide a return force for the rotated reel. And still further, note that fishing line 660 may now be released in a forward direction over the track guides of the reel, rather than spooling directly off the reel in the same direction of its orientation as will occur with the reel in its original position as depicted at the top at FIG. 6A. Finally, as depicted at the bottom at FIG. 6B, the reel may be said to be rotated 90 degrees upon a transaxial plane so as to result in the rod remaining upon a transaxial plane while the reel is rotated into a transverse plane, effectively bisecting the reel at the connection point of the rotatable mount. Alternatively stated, the reel at the bottom occupies a plane perpendicular and 90 degrees offset from the plane of the rod 645.

The reel may then be returned from its rotated or pivoted position at element 620 into its original non-pivoted position as indicated by element 615 by rotating the reel in the direction indicated by directional arrow 635.

Note further that the reel is formed within two "rims" or sides of the reel, within which the channel resides to collect or spool the fishing line 660. Conventional reels do not fully expose both sides of the rim in such a way for the purposes of hand operation and hand braking because the reel will either be fully or partially enclosed within a housing or be obstructed by its mounting brace. Conversely, the reel depicted here permits an angler to apply hand or finger pressure to either rim, thus palming or fingering the reel to slow or arrest its rotation.

Note further that in its rotated position 620, the reel permits single-handed operation by the angler which holds the handle and positions a finger onto either the lever for resistive braking or onto the reel itself for friction braking, depending on the preference of the user.

Because the reel is able to pivot into a rotated position, perpendicular to the rod, the fishing line 660 may be fed off the reel sideways, but in a forward direction, thus permitting a fly cast which would normally pull the fishing line out of a worn basket, but instead pulls the fishing line off of the reel sideways, without spinning the reel itself. Moreover, free spooling the line is enabled from the sideways reel without having line at the feet of the angler which is more likely to become tangled or caught.

Conventional reels which permit free spooling typically utilize a switch to permit the reel to spin without resistance, in which case an angler hand pulls line off the reel and onto the ground or into a basket, but such a solution risks tangling of the line and does not permit the sideways pull of the line from a pivoted reel as is depicted at the bottom, at FIG. 6B. According to such an embodiment, the angler may hold the line by pinching the line between the angler's thumb and the forward rim of the reel in its pivoted position, so as to prevent the line from falling off or coming off of the reel over the side of the forward rim. Thus, the angler may still maintain line control and manage release of the line even without returning the reel to its original position.

An additional benefit of the fly fishing reel and rod system 600 is improved balance of the system 600 by having the counterweight act as a counterweight to the tension and pull at the end of the rod, thus lessening shoulder strain of the angler when casting utilizing such a fly fishing reel and rod system 600.

FIGS. 7A, 7B, and 7C depict another view of a fly fishing reel and rod system 700, in accordance with described embodiments.

Similar to that which is discussed above with regard to FIGS. 6A and 6B, the fly fishing reel and rod system 700 shown here permits the reel at its original position 705 which is in-line with the rod to rotate 90 degrees as shown by directional arrow 745 (showing the reel partially rotated) so as to orient the reel into its rotated or pivoted position by continuing the rotation depicted via directional arrow 755 (showing the reel in its nearly fully rotated at element 710) ultimately permitting the reel to come to rest in its fully rotated position at element 715 in which the reel is positioned within a plane at a 90 degree offset from the plane occupied by the rod.

Note that in the topmost figure, the stop of the structural brace is parallel with the surface of the rotatable mount and not in contact with the rotatable mount, while the stop in the middle depiction is nearing contact with the rotatable mount and ultimately the stop of the structural brace at the bottom depiction makes contact with the rotatable mount so as to align the reel at its 90 degree fully pivoted position.

FIGS. 8A and 8B depict alternative views of the fly fishing reel and rod system 800, in accordance with described embodiments.

There is again depicted a rod 840, a variable resistance brake lever 820 in its default position which is contacting the reel 805, the fishing line 815, and a post 835 upon the reel via which to rotate the reel. Note that the opposing side of the reel 805 as shown at the bottom depiction does not have a post 835.

Furthermore, it may now be observed at element 850 that an internal spring 830A is embodied within the rotatable mount connecting the reel 805 with the rod 840. As the reel is rotated via the rotatable mount, a spring load is induced into the internal spring 830A via which a return force is then present so as to pull or retract the reel from a pivoted position back into its original position. Alternatively, the external spring 830B may be utilized for the same purpose, as is depicted at the bottom portion, at FIG. 8B.

Figure 9:
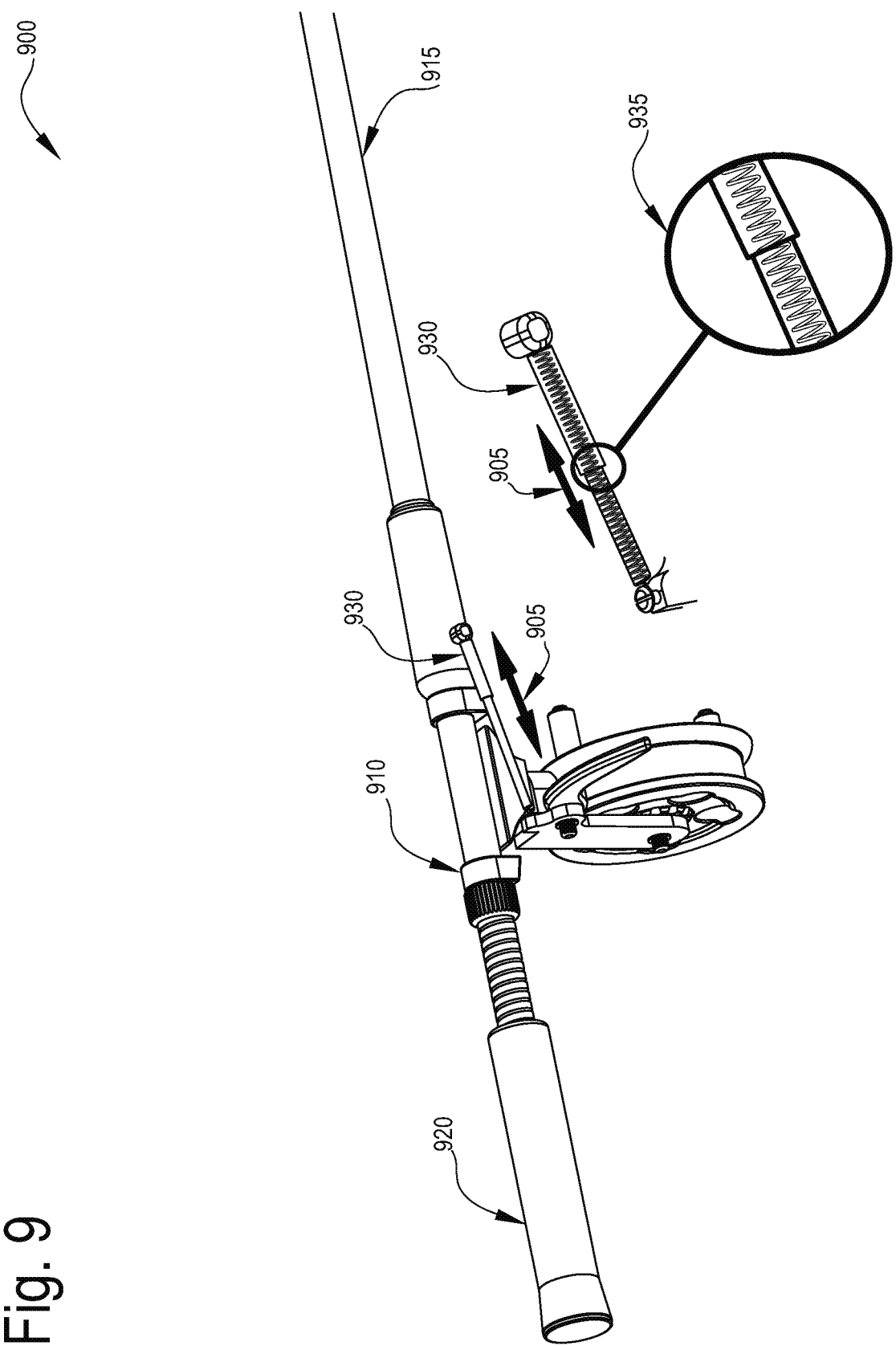
FIG. 9 depicts another view of a fly fishing reel and rod system, in accordance with described embodiments.

FIG. 9 depicts another view of a fly fishing reel and rod system 900, in accordance with described embodiments.

There is again depicted a rod 915, rod handle 920, a releasable connector 910 for the rotatable mount, and an external spring 930 connected to the connection point on the rod and a connection point on the structural brace of the reel. Further depicted here is the directional arrow 905 indicating that the spring mechanism 930 may be elongated by rotating the reel thus inducing a spring load into the spring and a proportional return force. Further depicted at element 935 is the spring housing for the external spring 930 which permits for a sealed and weather resistant environment to protect the external spring internals from moisture, sand, and oxidizing elements likely to be in the environment within which the fly fishing reel and rod system 900 is to be used.

It is therefore in accordance with the described embodiments:

There is a fishing reel assembly, which includes at least: a rotatable mount having a mount segment which is to affix the fishing reel assembly with a mount receiver of a fishing rod and a rotating segment, in which the rotating segment pivots upon an axis separate from the mount segment; a structural brace affixed to the rotating segment of the rotatable mount; a centerpin mount affixed to the structural brace at a first end of the centerpin; a reel mounted upon the centerpin and affixed to the centerpin via a fastener secured to a second end of the centerpin, in which the reel is to rotate upon the centerpin between the structural brace and the fastener; a variable resistance braking assembly affixed to the rotating segment of the rotatable mount, in which the variable resistance braking assembly is to pivot with the reel, in which the variable resistance braking assembly includes at least (i) a lever, (ii) a spring, and (iii) a resistance contact point oriented at a portion of the lever which makes physical contact with the reel; and in which the spring has a preload to pull the resistance contact point of the lever into the reel and further in which braking force of the variable resistance braking assembly is increased when the lever is pressed into the reel and decreased or negated when the variable resistance braking assembly is retracted from the reel.

According to another embodiment of the fixing reel assembly, the spring includes an external spring having a first end affixed to the lever and a second portion affixed to one of the structural brace or to the rotating segment of the rotatable mount, in which external spring is to pivot with the reel without increasing a spring load or decreasing the spring load of the spring during any pivot of the reel.

According to another embodiment of the fixing reel assembly, the external spring includes a spring housing encompassing the external spring; and in which the spring housing encloses the external spring within a sealed and weather resistant environment to protect the external spring internals from moisture, sand, and/or oxidizing elements within an environment external to the spring housing.

According to another embodiment of the fixing reel assembly, the variable resistance braking assembly is affixed to the rotating segment of the rotatable mount via the lever at a second pivot point, separate from the rotating segment of the rotatable mount; in which the spring includes an internal spring enclosed within the second pivot point via which the lever is affixed to the rotating segment of the rotatable mount; and in which any pivot motion of the reel does not increase a spring load or decrease the spring load of the internal spring.

According to another embodiment of the fixing reel assembly, the preload of the spring is tunable by increasing or decreasing the preload of the spring; in which increasing the preload of the spring increases the braking force of the resistance contact point applied to the reel without the lever being pressed into the reel; and in which decreasing the preload of the spring decreases or eliminates the braking force of the resistance contact point applied to the reel without the lever being retracted from the reel.

According to another embodiment of the fixing reel assembly, the reel mounted upon the centerpin further includes: a plurality of finger holes bored through the reel; and in which a user of the fishing reel assembly operates the reel via the finger holes to cause the reel to rotate upon the centerpin in either a forward or a backward direction.

According to another embodiment of the fixing reel assembly, the reel mounted upon the centerpin further includes: a first face oriented toward the structural brace; a second face oriented away from the structural brace; in which one or more winding posts are affixed to the second face of the reel unobstructed by the structural brace; and in which a user of the fishing reel assembly operates the reel via the one or more winding posts to cause the reel to rotate upon the centerpin in either a forward or a backward direction.

According to another embodiment of the fixing reel assembly, the reel includes two rims and a channel; in which a first rim is formed upon a first face oriented toward the structural brace; in which a second rim is formed upon a second face oriented away from the structural brace on an opposing side of the reel from the first face; in which the channel is formed between the first and second faces of the reel; and in which the resistance contact point of the variable resistance braking assembly induces the braking force into the reel by contacting the reel atop the first rim.

According to another embodiment of the fixing reel assembly, the resistance contact point includes a replaceable brake pad formed from one of a rubberized braking composite, a metallic braking composite, or a ceramic braking composite.

According to another embodiment of the fixing reel assembly, the reel includes two rims and a channel; in which a first rim is formed upon a first face oriented toward the structural brace; in which a second rim is formed upon a second face oriented away from the structural brace on an opposing side of the reel from the first face; in which the channel is formed between the first and second faces of the reel; and in which the reel of the fishing reel assembly is a housing-free reel having both the first and the second rim exposed.

According to another embodiment of the fixing reel assembly, the fastener secured to the second end of the centerpin includes a tool-less removal fastener; and in which the reel is removable from the centerpin of the fishing reel assembly via hand-loosening of the tool-less removal fastener and further in which the reel is re-attachable to the centerpin of the fishing reel assembly via hand-tightening the tool-less removal fastener to the second end of the centerpin.

According to another embodiment of the fixing reel assembly, the reel when removed from the centerpin of the fishing reel assembly operates as a handline reel.

According to another embodiment of the fixing reel assembly, the structural brace includes a pivot stop; and in which the reel is to pivot upon its axis until the pivot stop of the structural brace makes physical contact with the mount segment of the rotatable mount.

According to another embodiment of the fixing reel assembly, the rotatable mount when affixed to the fishing pole is oriented within a first plane, in which the fishing pole's length is oriented within the first plane with the mount segment and the rotating segment and the reel; and in which the reel is to pivot into a second plane perpendicular to the first plane by pivoting the reel, the structural brace, and the rotating segment upon the axis of the rotatable mount until the pivot stop of the structural brace comes into contact with the non-rotated mount segment.

According to another embodiment of the fixing reel assembly, the reel of the fixing reel assembly pivots from an orientation parallel with the fishing rod into a rotated orientation perpendicular with the fishing rod.

According to another embodiment, the fixing reel assembly further includes: a second spring; in which the second spring includes an internal spring embedded within the rotatable mount; and in which pivoting the rotatable segment of the rotatable mount upon its axis from an original position into a pivoted position induces increased spring load into the second spring; and in which the increased spring load of the second spring exhibits a return force to return the rotatable segment of the rotatable mount from the pivoted position to the original position.

According to another embodiment, the fixing reel assembly further includes: a second spring; in which the second spring includes an external spring having a first end affixed to the rotatable segment of the rotatable mount and a second end affixed to the mount segment of the rotatable mount or to be affixed to the fishing rod; and in which pivoting the rotatable segment of the rotatable mount upon its axis from an original position into a pivoted position induces increased spring load into the second spring; and in which the increased spring load of the second spring exhibits a return force to return the rotatable segment of the rotatable mount from the pivoted position to the original position.

According to another embodiment, there is a fishing rod and reel system, including: a fishing rod; a fishing reel assembly; and in which the fishing reel assembly includes: a rotatable mount having a mount segment which is to affix the fishing reel assembly with a mount receiver of a fishing rod and a rotating segment, in which the rotating segment pivots upon an axis separate from the mount segment; a structural brace affixed to the rotating segment of the rotatable mount; a centerpin mount affixed to the structural brace at a first end of the centerpin; a reel mounted upon the centerpin and affixed to the centerpin via a fastener secured to a second end of the centerpin, in which the reel is to rotate upon the centerpin between the structural brace and the fastener; a variable resistance braking assembly affixed to the rotating segment of the rotatable mount, in which the variable resistance braking assembly is to pivot with the reel, in which the variable resistance braking assembly includes at least (i) a lever, (ii) a spring, and (iii) a resistance contact point oriented at a portion of the lever which makes physical contact with the reel; and in which the spring has a preload to pull the resistance contact point of the lever into the reel and further in which braking force of the variable resistance braking assembly is increased when the lever is pressed into the reel and decreased or negated when the variable resistance braking assembly is retracted from the reel.

According to such an embodiment of the fishing rod and reel system, the fishing rod resides upon a transaxial plane; in which the fishing reel in an original position resides within the transaxial plane with the fishing rod; and in which the fishing reel rotates into a transverse plane perpendicular to the transaxial plane by pivoting the reel upon the rotating segment of the rotatable mount from the original position into a pivoted position.

According to yet another embodiment, there is a method of operating a fishing rod and reel system, in which the method includes: casting a fishing fly attached to fishing line from the fishing rod of the fishing rod and reel system without spinning the reel of the fishing rod and reel system; in which the fishing rod and reel system includes: the fishing rod and the reel within a fishing reel assembly, the fishing reel assembly including: a rotatable mount having a mount segment which is to affix the fishing reel assembly with a mount receiver of the fishing rod and a rotating segment, in which the rotating segment pivots upon an axis separate from the mount segment, a structural brace affixed to the rotating segment of the rotatable mount, a centerpin mount affixed to the structural brace at a first end of the centerpin, the reel mounted upon the centerpin and affixed to the centerpin via a fastener secured to a second end of the centerpin, in which the reel is to rotate upon the centerpin between the structural brace and the fastener, the fishing line at least partially spooled upon the reel, a variable resistance braking assembly affixed to the rotating segment of the rotatable mount, in which the variable resistance braking assembly is to pivot with the reel, in which the variable resistance braking assembly includes at least (i) a lever, (ii) a spring, and (iii) a resistance contact point oriented at a portion of the lever which makes physical contact with the reel, and in which the spring has a preload to pull the resistance contact point of the lever into the reel and further in which braking force of the variable resistance braking assembly is increased when the lever is pressed into the reel and decreased or negated when the variable resistance braking assembly is retracted from the reel; and in which the casting includes at least: pivoting the reel from an original position having the fishing rod and the reel in parallel to a pivoted position having the fishing rod and the reel perpendicular to each other; and casting the fishing fly attached to the fishing line from the fishing rod by despooling the fishing line over a front facing rim of the reel without spinning the reel.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A fishing reel assembly, comprising:
    a rotatable mount having a mount segment which is to affix the fishing reel assembly with a mount receiver of a fishing rod and a rotating segment, wherein the rotating segment pivots upon an axis separate from the mount segment;
    a structural brace affixed to the rotating segment of the rotatable mount;
    a centerpin mount affixed to the structural brace at a first end of the centerpin;
    a reel mounted upon the centerpin and affixed to the centerpin via a fastener secured to a second end of the centerpin, wherein the reel is to rotate upon the centerpin between the structural brace and the fastener;
    a variable resistance braking assembly affixed to the rotating segment of the rotatable mount, wherein the variable resistance braking assembly is to pivot with the reel, wherein the variable resistance braking assembly includes at least (i) a lever, (ii) a spring, and (iii) a resistance contact point oriented at a portion of the lever which makes physical contact with the reel; and
    wherein the spring has a preload to pull the resistance contact point of the lever into the reel and further wherein braking force of the variable resistance braking assembly is increased when the lever is pressed into the reel and decreased or negated when the variable resistance braking assembly is retracted from the reel.

2. The fishing reel assembly of claim 1:
    wherein the spring comprises an external spring having a first end affixed to the lever and a second portion affixed to one of the structural brace or to the rotating segment of the rotatable mount, wherein external spring is to pivot with the reel without increasing a spring load or decreasing the spring load of the spring during any pivot of the reel.

3. The fishing reel assembly of claim 2:
    wherein the external spring comprises a spring housing encompassing the external spring; and
    wherein the spring housing encloses the external spring within a sealed and weather resistant environment to protect internals of the external spring from moisture, sand, and/or oxidizing elements within an environment external to the spring housing.

4. The fishing reel assembly of claim 1:
wherein the variable resistance braking assembly is affixed to the rotating segment of the rotatable mount via the lever at a second pivot point, separate from the rotating segment of the rotatable mount;
wherein the spring comprises an internal spring enclosed within the second pivot point via which the lever is affixed to the rotating segment of the rotatable mount; and
wherein any pivot motion of the reel does not increase a spring load or decrease the spring load of the internal spring.

5. The fishing reel assembly of claim 1:
wherein the preload of the spring is tunable by increasing or decreasing the preload of the spring;
wherein increasing the preload of the spring increases the braking force of the resistance contact point applied to the reel without the lever being pressed into the reel; and
wherein decreasing the preload of the spring decreases or eliminates the braking force of the resistance contact point applied to the reel without the lever being retracted from the reel.

6. The fishing reel assembly of claim 1:
wherein the reel mounted upon the centerpin further comprises:
a plurality of finger holes bored through the reel; and
wherein a user of the fishing reel assembly operates the reel via the finger holes to cause the reel to rotate upon the centerpin in either a forward or a backwards direction.

7. The fishing reel assembly of claim 1:
wherein the reel mounted upon the centerpin further comprises:
a first face oriented toward the structural brace;
a second face oriented away from the structural brace;
wherein one or more winding posts are affixed to the second face of the reel unobstructed by the structural brace; and
wherein a user of the fishing reel assembly operates the reel via the one or more winding posts to cause the reel to rotate upon the centerpin in either a forward or a backwards direction.

8. The fishing reel assembly of claim 1:
wherein the reel comprises two rims and a channel;
wherein a first rim is formed upon a first face oriented toward the structural brace;
wherein a second rim is formed upon a second face oriented away from the structural brace on an opposing side of the reel from the first face;
wherein the channel is formed between the first and second faces of the reel; and
wherein the resistance contact point of the variable resistance braking assembly induces the braking force into the reel by contacting the reel atop the first rim.

9. The fishing reel assembly of claim 8:
wherein the resistance contact point comprises a replaceable brake pad formed from one of a rubberized braking composite, a metallic braking composite, or a ceramic braking composite.

10. The fishing reel assembly of claim 1:
wherein the reel comprises two rims and a channel;
wherein a first rim is formed upon a first face oriented toward the structural brace;
wherein a second rim is formed upon a second face oriented away from the structural brace on an opposing side of the reel from the first face;
wherein the channel is formed between the first and second faces of the reel; and
wherein the reel of the fishing reel assembly is a housing-free reel having both the first and the second rim exposed.

11. The fishing reel assembly of claim 1:
wherein the fastener secured to the second end of the centerpin comprises a tool-less removal fastener; and
wherein the reel is removable from the centerpin of the fishing reel assembly via hand-loosening of the tool-less removal fastener and further wherein the reel is re-attachable to the centerpin of the fishing reel assembly via hand-tightening the tool-less removal fastener to the second end of the centerpin.

12. The fishing reel assembly of claim 1, wherein the reel, when removed from the centerpin of the fishing reel assembly, operates as a handline reel.

13. The fishing reel assembly of claim 1:
wherein the structural brace comprises a pivot stop; and
wherein the reel is to pivot upon its axis until the pivot stop of the structural brace makes physical contact with the mount segment of the rotatable mount.

14. The fishing reel assembly of claim 13:
wherein the rotatable mount when affixed to the fishing pole is oriented within a first plane;
wherein the fishing pole's length is oriented within the first plane with the mount segment and the rotating segment and the reel; and
wherein the reel is to pivot into a second plane perpendicular to the first plane by pivoting the reel, the structural brace, and the rotating segment upon the axis of the rotatable mount until the pivot stop of the structural brace comes into contact with the mount segment which does not rotate.

15. The fishing reel assembly of claim 1:
wherein the reel of the fishing reel assembly pivots from an orientation parallel with the fishing rod into a rotated orientation perpendicular with the fishing rod.

16. The fishing reel assembly of claim 1, further comprising:
a second spring;
wherein the second spring comprises an internal spring embedded within the rotatable mount; and
wherein pivoting the rotatable segment of the rotatable mount upon its axis from an original position into a pivoted position induces increased spring load into the second spring; and
wherein the increased spring load of the second spring exhibits a return force to return the rotatable segment of the rotatable mount from the pivoted position to the original position.

17. The fishing reel assembly of claim 1, further comprising:
a second spring;
wherein the second spring comprises an external spring having a first end affixed to the rotatable segment of the rotatable mount and a second end affixed to the mount segment of the rotatable mount or to be affixed to the fishing rod; and
wherein pivoting the rotatable segment of the rotatable mount upon its axis from an original position into a pivoted position induces increased spring load into the second spring; and wherein the increased spring load of the second spring exhibits a return force to return the rotatable segment of the rotatable mount from the pivoted position to the original position.

18. A fishing rod and reel system, comprising:
the fishing rod of the fishing rod and reel system;
a fishing reel assembly; and
wherein the fishing reel assembly comprises:
- a rotatable mount having a mount segment which is to affix the fishing reel assembly with a mount receiver of a fishing rod and a rotating segment, wherein the rotating segment pivots upon an axis separate from the mount segment;
- a structural brace affixed to the rotating segment of the rotatable mount;
- a centerpin mount affixed to the structural brace at a first end of the centerpin;
- a reel mounted upon the centerpin and affixed to the centerpin via a fastener secured to a second end of the centerpin, wherein the reel is to rotate upon the centerpin between the structural brace and the fastener;
- a variable resistance braking assembly affixed to the rotating segment of the rotatable mount, wherein the variable resistance braking assembly is to pivot with the reel, wherein the variable resistance braking assembly includes at least (i) a lever, (ii) a spring, and (iii) a resistance contact point oriented at a portion of the lever which makes physical contact with the reel; and
- wherein the spring has a preload to pull the resistance contact point of the lever into the reel and further wherein braking force of the variable resistance braking assembly is increased when the lever is pressed into the reel and decreased or negated when the variable resistance braking assembly is retracted from the reel.

19. The fishing rod and reel system of claim 18:
wherein the fishing rod resides upon a transaxial plane;
wherein the fishing reel in an original position resides within the transaxial plane with the fishing rod; and
wherein the fishing reel rotates into a transverse plane perpendicular to the transaxial plane by pivoting the reel upon the rotating segment of the rotatable mount from the original position into a pivoted position.

20. A method of operating a fishing rod and reel system, wherein the method comprises:
casting a fishing fly attached to fishing line from the fishing rod of the fishing rod and reel system without spinning the reel of the fishing rod and reel system;
wherein the fishing rod and reel system comprises:
- the fishing rod and the reel within a fishing reel assembly, the fishing reel assembly comprising: a rotatable mount having a mount segment which is to affix the fishing reel assembly with a mount receiver of the fishing rod and a rotating segment, wherein the rotating segment pivots upon an axis separate from the mount segment, a structural brace affixed to the rotating segment of the rotatable mount, a centerpin mount affixed to the structural brace at a first end of the centerpin, the reel mounted upon the centerpin and affixed to the centerpin via a fastener secured to a second end of the centerpin, wherein the reel is to rotate upon the centerpin between the structural brace and the fastener, the fishing line at least partially spooled upon the reel, a variable resistance braking assembly affixed to the rotating segment of the rotatable mount, wherein the variable resistance braking assembly is to pivot with the reel, wherein the variable resistance braking assembly includes at least (i) a lever, (ii) a spring, and (iii) a resistance contact point oriented at a portion of the lever which makes physical contact with the reel, and wherein the spring has a preload to pull the resistance contact point of the lever into the reel and further wherein braking force of the variable resistance braking assembly is increased when the lever is pressed into the reel and decreased or negated when the variable resistance braking assembly is retracted from the reel; and
wherein the casting comprises at least:
pivoting the reel from an original position having the fishing rod and the reel in parallel to a pivoted position having the fishing rod and the reel perpendicular to each other; and
casting the fishing fly attached to the fishing line from the fishing rod by despooling the fishing line over a front facing rim of the reel without spinning the reel.

* * * * *